United States Patent [19]

Harvey, II et al.

[11] 4,206,190
[45] Jun. 3, 1980

[54] PLASMA ARC PRODUCTION OF SILICON NITRIDE

[75] Inventors: Francis J. Harvey, II, Murrysville; Raymond J. Bratton, Delmont, both of Pa.

[73] Assignee: Westinghouse Electric Corp., Pittsburgh, Pa.

[21] Appl. No.: 450,257

[22] Filed: Mar. 11, 1974

[51] Int. Cl.$^2$ .................. C01B 21/06; C01B 39/00
[52] U.S. Cl. ............................ 423/344; 204/164
[58] Field of Search ............. 423/344, 324, 406, 325; 204/164, 177, 178; 250/542

[56] References Cited

U.S. PATENT DOCUMENTS

| | | | |
|---|---|---|---|
| 3,658,673 | 4/1972 | Kugler | 204/164 |
| 3,704,094 | 11/1972 | McClincy | 423/350 |
| 3,733,387 | 5/1973 | Kugler | 423/325 |
| 3,892,840 | 7/1975 | Abiltrup | 423/325 |

FOREIGN PATENT DOCUMENTS 221022  6/1968  Sweden .......................... 423/344 UX

OTHER PUBLICATIONS

Sidgwick, N.Y.; The Chemical Elements and Their Compounds, vol. I, Clarendon Press, Oxford, p. 658.
Berezhnoi, A. S., Silicon and Its Binary Systems Consultants Bureau, New York, 1960, p. 4.

Primary Examiner—L. Dewayne Rutledge
Assistant Examiner—Michael L. Lewis
Attorney, Agent, or Firm—R. T. Randig

[57] ABSTRACT

This is a method of producing silicon nitride in a plasma arc furnace utilizing silicon metal or silicon dioxide as a starting material. When silicon metal is used it is reacted directly with a nitrogen bearing gas to produce silicon nitride. When silicon dioxide is used a two-step process is performed wherein the silicon dioxide is first reacted with hydrogen to produce silicon monoxide gas and water and thereafter the silicon monoxide gas is reacted with hydrogen and nitrogen to produce silicon nitride and water.

9 Claims, No Drawings

PLASMA ARC PRODUCTION OF SILICON NITRIDE

BACKGROUND OF THE INVENTION

The present invention relates generally to the production of metal nitride, and more particularly to the production of silicon nitride utilizing a plasma arc heater for supplying the heat and environment for the reactions.

DESCRIPTION OF THE PRIOR ART

The most common prior art technique for producing silicon nitride has been to start with silicon dioxide and by suitable reactions react the silicon dioxide with a chlorine containing material to produce silicon chloride. The silicon chloride in gaseous form is then reacted to form silicon nitride. This, of necessity, has been a two stage, two step process requiring first the chlorination of the silicon dioxide, and thereafter the reaction of the silicon chloride to produce silicon nitride. This has proved to be both time consuming and rather expensive, both from the aspect of the time and equipment involved as well as from the cost of the material and the nature of the reaction.

Also, prior art techniques have included the direct reaction of silicon metal in solid form with nitrogen to form silicon nitride. However, the kinetics of this reaction result in a rather slow process, it taking several hours to produce the necessary uniform silicon nitride end product.

SUMMARY OF THE PRESENT INVENTION

According to the present invention, a plasma arc heater is utilized to produce silicon nitride directly from silicon dioxide or silicon metal. When silicon metal is utilized the silicon is heated to a sufficiently high temperature that the reaction takes place relatively rapidly with the silicon in a liquid form. In the case of the silicon dioxide, the silicon dioxide is reacted in two steps first to form silicon monoxide gas and thereafter the silicon monoxide gas is reacted to form the silicon nitride end product. In the case of both the silicon and the silicon dioxide starting materials, the process can be carried out quickly and efficiently with no intermediate chlorination step required.

DESCRIPTION OF THE PREFERRED EMBODIMENTS

In one embodiment of the present invention, silicon metal is utilized as the starting material. In this embodiment, a plasma arc heater is provided which conventionally has a reaction chamber with an entrance for the reaction material into the reaction chamber wherein the plasma provides the necessary heat. The reactants are introduced into this chamber which is conventionally an elongated chamber, and they flow into the plasma and through the chamber to the exit thereof. In practice, the size and shape of the arc struck between the electrodes is controlled by blowing a gas into the arc and in the present invention it is preferred that this gas be a nitrogen gas which will serve as the reaction gas for heating and reacting with the silicon material as well as the gas for controlling the arc. The metallic silicon is introduced into the reaction chamber in close proximity or even into the arc in small solid particulate form, it being desirable that these particles be as small as practicable, and in practice this can be as small as 8 microns or less in size. The heating of the arc is controlled to produce a temperature in the reaction chamber of the silicon particulate material of between 1683° K. and 2170° K. It is necessary that the heat be at least 1683° K. in order to liquify the solid particles of the silicon to thereby substantially increase the rate of reaction allowing the formation of the silicon nitride which is exhausted as a solid from the reaction chamber. The temperature should not exceed 2170° K. at which temperature the standard free energy change for the reaction is zero. Hence, temperatures above this would not provide a full yield and, in fact, the silicon nitride formed would be unstable and tend to decompose. Hence, the temperature should be controlled to between 1680° K. and 2170° K. to obtain the desired rate of reaction with a desirable yield of material. In this case, the reaction is a simple reaction of silicon metal with nitrogen gas to provide the desired end product, the plasma arc heater being utilized to provide and maintain the silicon at a sufficiently elevated temperature to be liquid.

However, a more economical starting material than silicon metal is silicon dioxide ($SiO_2$). When $SiO_2$ is utilized as a starting material there is a two step process which is required, the first step of the process being to reduce the $SiO_2$ to SiO gas, and thereafter in the second step, react the SiO gas with nitrogen to produce silicon nitride as the desired end product. In this case a plasma arc heater is utilized having a higher temperature reaction section which is adjacent to the arc and a lower temperature reaction downstream from the arc, the first step of the reaction taking place in the higher temperature reaction section, and the second step taking place in the lower temperature reaction section. In practice, silicon dioxide material in fine particulate form is utilized. Again it is desirable that the particles be as fine as possible, even as small as 8 microns or less. The $SiO_2$ particles are introduced into the higher temperature reaction section of the reaction chamber adjacent the arc. Hydrogen gas can be introduced with the particulate silicon material, or it can be introduced by way of a gas to control the arc as previously indicated. In either case the temperature in this higher temperature reaction section should be above 2500° K. to promote the reaction of the $SiO_2$ gas with the hydrogen to produce silicon monoxide and water. The equation for this reaction is as follows:

$$SiO_2 + H_2 \rightarrow SiO + H_2O$$

The reaction product of SiO gas and $H_2O$ is allowed to flow from the higher temperature reaction section to the lower temperature reaction section of the plasma arc heater at which point a nitrogen bearing gas, and, if necessary, additional hydrogen is introduced to react with the SiO gas to provide silicon nitride and $H_2O$. This reaction is as follows:

$$3SiO + 3H_2 + 2N_2 \rightarrow Si_3N_4 + 3H_2O$$

This reaction must take place below 2170° K., and preferably should be below 1600° K. optimumly in the area of 1500° K. It must be below 2170° K. since above this temperature the silicon nitride will decompose and is unstable. Further the standard free energy change for the reaction of reacting this silicon oxide with the hydrogen and nitrogen in the equation given above is zero at 1600° K. Thus, while the reaction will proceed to a certain percentage of completion between 1600° K. and 2170° K., nevertheless it should be below 1600° K. to obtain a maximum yield. Thus it is preferred that the reaction should be carried out slightly below 1600° K., e.g. 1500° K. for a satisfactory percentage yield while still proceeding rapidly enough.

In controlling the temperature in the lower temperature reaction section a convenient technique is to regulate the amount of gas introduced in this section and the temperature of the gas introduced. Conventionally this section is merely a continuation of a continuous chamber of the plasma arc heater, and as the material flows from the higher temperature section adjacent the arc to this section the flow of the gas can be regulated so that at the exit end the material is at approximately 1500° K. and the material can then be cooled from this temperature.

It is also contemplated that various reductants can be added with the $SiO_2$ starting material such as carbon, magnesium, aluminum, and calcium. Also, it is contemplated that where either nitrogen bearing or hydrogen bearing gases are needed, ammonia gas can be used either alone or in combination with the hydrogen and/or nitrogen to provide the necessary gas for the reaction. This can be done either as a gas controlling the arc, or it can be introduced with the material or downstream as the need dictates.

In both embodiments of the invention the resulting product is a very fine, uniform particulate material, and this is well adapted for sintering which is the conventional technique for forming silicon nitride articles.

What is claimed is:

1. A method of forming particulate silicon nitride comprising the steps of:
   providing a plasma arc heater having a high heat reaction section and a low heat reaction section,
   introducing particulate silicon dioxide and a hydrogen containing gas into the high heat section of the plasma arc heater, the hydrogen functioning to sustain the plasma and react with the silicon dioxide,
   controlling the flow of hydrogen within the plasma arc heater to provide a temperature above 2500° K., said temperature being sufficient to cause a reaction between the silicon dioxide and at least a part of the hydrogen to form reaction products including silicon monoxide,
   transferring the reaction products including silicon monoxide and unreacted hydrogen to the low heat reaction section of the plasma arc heater,
   introducing a nitrogen containing gas into the low heat reaction section, and
   controlling the nitrogen containing gas flow to provide a temperature within the low heat reaction section to below 2170° K., said temperature being sufficient to cause a reaction between the hydrogen and the silicon monoxide and at least a portion of the nitrogen to form particulate silicon nitride within the low heat reaction section, said silicon nitride characterized by a fine and uniform particle size suitable for use in the production of sintered articles.

2. The invention as defined in claim 1 wherein the temperature in the lower heat reaction section is controlled to produce a temperature below 1600° K.

3. The invention as defined in claim 1 wherein the gas introduced in the high heat reaction section is hydrogen gas in excess of the amount needed for reaction.

4. The invention as defined in claim 1 wherein the nitrogen bearing gas introduced into the lower heat reaction section is nitrogen.

5. A method of forming particulate silicon nitride comprising the steps of:
   providing a plasma arc heater having a heat reaction section,
   introducing into the arc heater reaction section a mixture of particulate silicon metal and a nitrogen bearing gas, controlling the temperature of the reaction section to heat the mixture to between 1683° K. and 2170° K. to liquefy the particles of silicon and reacting the liquefied particles of silicon metal with the nitrogen to form particulate silicon nitride within the reaction section, said silicon nitride characterized by a fine and uniform particle size suitable for use in the production of sintered articles.

6. The invention as defined in claim 5 wherein the nitrogen bearing gas in $N_2$.

7. The method of claim 5 wherein the average particle size of the solid, particulate silicon metal is less than about 8 microns.

8. The method of claim 1 including the step of introducing a hydrogen containing gas into the low heat reaction section, said hydrogen containing gas being in addition to the unreacted hydrogen transferred thereto from the high heat reaction section.

9. The method of claim 1 including the step of adding a reductant selected from the group consisting of magnesium, aluminum, and calcium with the silicon dioxide prior to the reaction between the silicon dioxide and the hydrogen.

* * * * *